US 9,187,255 B2

(12) United States Patent
Oullette et al.

(10) Patent No.: US 9,187,255 B2
(45) Date of Patent: Nov. 17, 2015

(54) VACUUM CONVEYOR APPARATUS FOR STABILIZING MULTIPLE LANES OF OBJECTS CONVEYED ON A CONVEYING SURFACE OF THE APPARATUS

(75) Inventors: Joseph F. Oullette, Glendale, MO (US); Richard J. Oullette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 829 days.

(21) Appl. No.: 13/354,668

(22) Filed: Jan. 20, 2012

(65) Prior Publication Data

US 2012/0217136 A1     Aug. 30, 2012

Related U.S. Application Data

(60) Provisional application No. 61/446,201, filed on Feb. 24, 2011.

(51) Int. Cl.
*B65G 21/00*     (2006.01)
*B65H 5/22*      (2006.01)
*B65G 21/20*     (2006.01)

(52) U.S. Cl.
CPC .... *B65G 21/2036* (2013.01); *B65G 2201/0244* (2013.01)

(58) Field of Classification Search
None
See application file for complete search history.

(56) References Cited

U.S. PATENT DOCUMENTS 4,253,783 A * 3/1981 Lenhart ................. 406/86
5,170,879 A * 12/1992 Smith .................... 198/452

* cited by examiner

*Primary Examiner* — Kavel Singh
(74) *Attorney, Agent, or Firm* — Joseph M. Rolnicki; Evans & Dixon, L.L.C.

(57) ABSTRACT

A vacuum conveyor apparatus stabilizes multiple single file lanes of objects conveyed on a conveying surface of the apparatus by directing vacuum pressure through multiple slots beneath the conveying surface where the multiple slots are aligned with the multiple lanes of objects on the conveying surface.

26 Claims, 9 Drawing Sheets

VACUUM CONVEYOR APPARATUS FOR STABILIZING MULTIPLE LANES OF OBJECTS CONVEYED ON A CONVEYING SURFACE OF THE APPARATUS

RELATED APPLICATIONS

This patent application claims the benefit of the filing date of provisional patent application No. 61/446,201, which was filed on Feb. 24, 2011.

BACKGROUND OF THE INVENTION

1. Field of the Invention

The present invention pertains to a vacuum conveyor apparatus that stabilizes multiple single file lanes of objects conveyed on a conveying surface of the apparatus by directing vacuum pressure through multiple slots beneath the conveying surface where the multiple slots are aligned with the multiple lanes of objects on the conveying surface.

2. Description of the Related Art

Conveying systems for conveying multiple objects, for example lightweight blow-molded plastic bottles being manufactured at a manufacturing facility, typically include portions of the conveying system that quickly convey multiple side-by-side lanes or streams of the bottles on a belt conveyor from one station of the conveying system to another station. For example, multiple side-by-side lanes of bottles may be conveyed on a conveying belt surface from a blow molding station where the bottles are formed to a downstream palletizing station where the bottles are arranged on pallets. Conveying the bottles in multiple side-by-side lanes or streams increases the overall efficiency of the conveying system as opposed to conveying a single lane of bottles. The multiple lanes of bottles are maintained in their side-by-side positions on the conveying belt surface by guide rails positioned over the belt surface. The guide rails extend along the belt surface length and along the opposite sides of each lane of bottles.

The multiple lanes of bottles on a first conveyor are often conveyed to a row former. The row former separates a set number of bottles from each of the lanes and forms them into parallel rows that then are moved by the row former to a second conveyor. A typical row former includes a plurality of straight, parallel bars. The spaces between adjacent pairs of bars receive the set number of bottles when forming them into a row. The row former bars generally align with the guide rails of the first conveyor when the row former bars are lowered as the row former area receives the bottles from the conveyor. The row former also has a conveying belt surface that is aligned with and moves in the same direction as the first conveyor belt surface.

The first conveyor typically has gates positioned at the ends of the conveyor guide rails and adjacent the row former bars. The gates are controlled to move between opened and closed positions. In the closed positions the conveying belt surface of the first conveyor continues to move and the gates prevent the multiple lanes of bottles between the guide rails from moving into the row former area. When the gates are operated to move to their opened positions they allow a set number of bottles from each of the selected multiple lanes of bottles on the first conveyor to pass the gates and move into the row former area. As the gates become opened, the first conveyor and the second conveyor are then accelerated to quickly move the desired number of bottles or containers in the selected lanes past the gates and are then decelerated as the predetermined numbers of bottles in the lanes near completion. Once the set number of bottles has passed the gates, the gates are then operated to move to their closed positions where the gates again hold back the multiple lanes of bottles as the conveying belt surface continues to move.

The end of the row former has stop surfaces between each pair of adjacent row former bars. The stop surfaces stop the movement of the released bottles as the conveying belt surface of the row former continues to move. With the desired number of bottles per rows having been achieved in the row former area and with the row former simultaneously arriving downwardly on opposite sides of the rows, the row former, with the arrayed rows of bottles, then moves in a direction perpendicular to the rows of bottles and sweeps the rows of bottles across the row former belt surface and onto a conveying surface of the second conveyor. The bars of the row former while moving forward also simultaneously move upward from the second conveyor surface, leaving the numbers of bottles in the first arranged rows of bottles on the second conveyor surface. The row former is then moved in the opposite direction back to its position where the row former bars are again aligned with the/first conveyor guide rails. The row former then moves downwardly, aligning the spacings between the row former bars with the multiple lanes of bottles that have been released by the gates of the first conveyor. When the set number of bottles passes the gates, the gates are again moved to their closed positions where the gates hold back the multiple lanes of bottles on the first conveyor. The row former reaches its lowered position over the row former area conveying belt surface just prior to the released numbers of bottles reaching the stop surfaces of the row former. The movement of the row former described earlier is then again repeated, leaving the numbers of bottles in the second arranged rows on the second conveyor surface. This movement of the row former is repeated in forming two dimensional arrays of bottles on the second conveyor.

In prior art conveyor systems, the configurations of some plastic blow molded bottles have presented problems. Bottles having a much larger height dimension relative to their width dimension tend to be unstable. Additionally many blow molded bottles are formed with bottom surfaces having recessed center areas or some other configurations that reduces the contact areas of the bottom surfaces with the conveyor belt surface. These make the bottles unstable.

When the lanes of bottles are released from the gates of the first conveyor and move onto the conveying surface of the row former, the row former conveying surface at first accelerates to quickly load the multiple lanes of bottles into the row former area and then quickly decelerates just before the multiple lanes of bottles come into contact with the stop surfaces at the end of the row former. This quick acceleration and deceleration of the multiple lanes of bottles on the row former conveying surface can result in bottles conveyed into the row former area falling over before the row former bars are lowered over the lanes of bottles.

Still further, when the multiple lanes of bottles moved into the area of the row former on the row former conveying surface contact the stop surfaces at the end of the row former, the contact can result in bottles at the ends of the multiple lanes of bottles being knocked over.

SUMMARY OF THE INVENTION

The apparatus of the invention provides a conveyor with a conveying surface that allows vacuum pressure to be transmitted from beneath the conveying surface to the top of the conveying surface. The vacuum pressure holds bottles in multiple spaced side-by-side lanes of bottles in their upright orientations and in their lane positions during movement of the conveying surface without relying on guide rails to hold the multiple lanes of bottles in their positions. Furthermore, the apparatus of the invention separates and directs the vacuum pressure along multiple paths beneath the conveying surface and beneath the multiple spaced side-by-side lanes of bottles conveyed on the conveying surface. The vacuum pressure is generally centered beneath the centers of each of the lanes of bottles conveyed on the conveying surface and stabilizes and holds the bottles in their upright orientations and in their side-by-side lanes during movement of the conveying surface. Still further, the apparatus of the invention enables changing the width dimension of the separated and directed paths of the vacuum pressure beneath the conveying surface and changing the spacing distance between the positions of the paths, enabling the vacuum conveyor of the invention to be employed in conveying bottles of a first diameter or width dimension in a number of spaced side-by-side lanes of bottles, and then changing over to convey bottles of a different diameter or width dimension from the first diameter or width dimension, in the number of spaced side-by-side lanes of bottles.

BRIEF DESCRIPTION OF THE DRAWINGS

Further features of the invention are set forth in the following detailed description of the preferred embodiment of the invention and in the drawing figures.

DETAILED DESCRIPTION OF THE APPARATUS OF THE INVENTION

Figure 1:
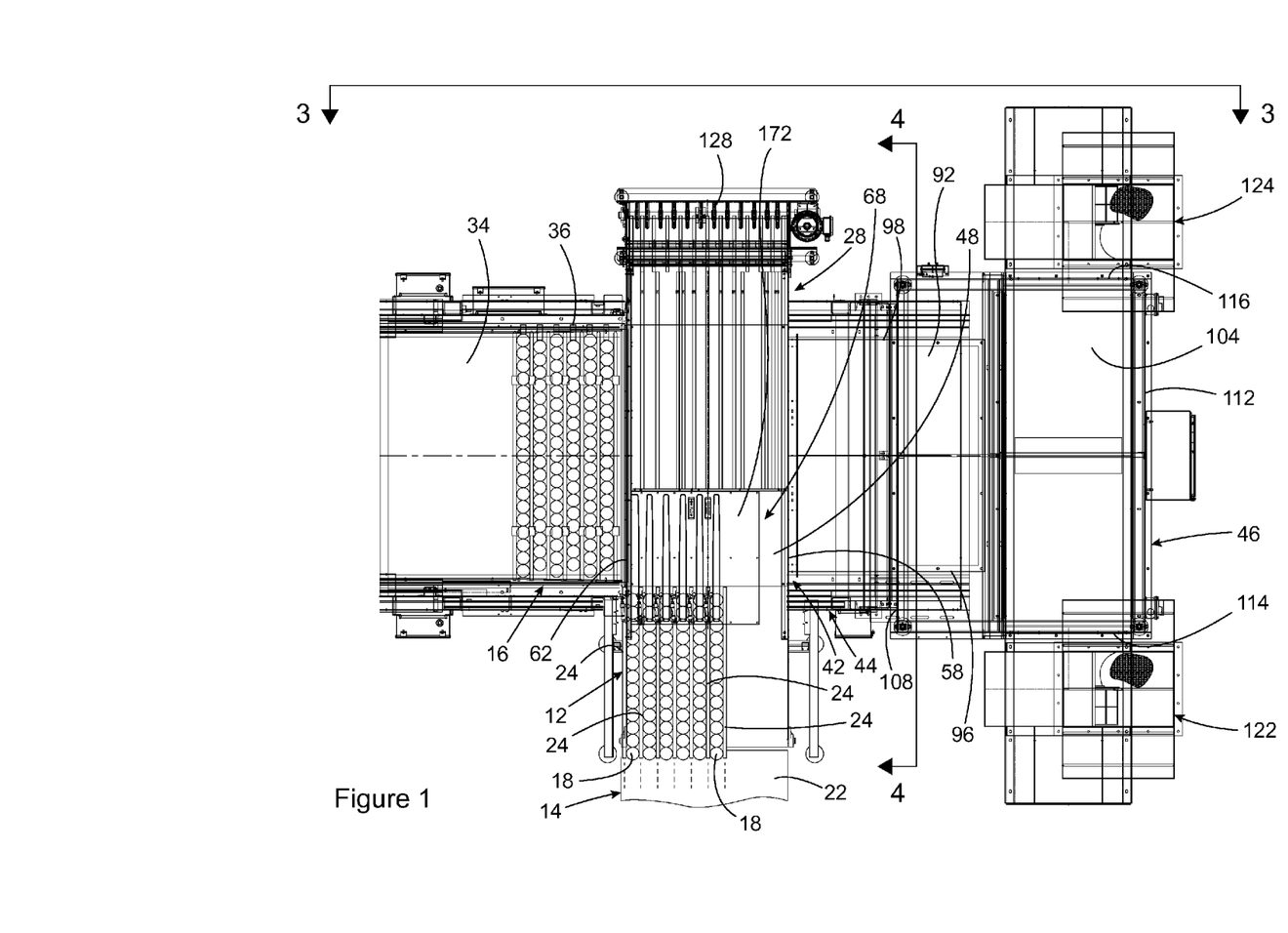
FIG. 1 is a top plan view of one illustrative environment of the vacuum conveyor apparatus of the invention employed with a first belt conveyor supplying multiple lanes of objects to the vacuum conveyor apparatus and a second belt conveyor having a row former leading away from the vacuum conveyor apparatus.

The vacuum conveyor apparatus 12 of the present invention is shown in FIG. 1 as a component part of a conveyor system that also includes a first conveyor assembly 14 leading to the apparatus 12 and a second conveyor assembly 16 leading away from the apparatus. In the illustrative environment shown in FIG. 1, the first conveyor assembly 14 conveys multiple lanes of objects 18 in single file lanes to the apparatus 12. The second conveyor assembly 16 conveys two dimensionally arranged arrays of the objects 18 away from the apparatus 12. In the description to follow, the objects 18 are lightweight, plastic blow-molded bottles. However, the reference to the bottles 18 is only illustrative. Other types of objects can be used with the vacuum conveyor apparatus 12 of the invention as well as with the first conveyor assembly 14 and the second conveyor assembly 16. Additionally, the objects could have different cross section configurations other than the circular configurations shown.

The first conveyor assembly 14 has a construction that, on its own and not used in combination with and in concert accelerated with the vacuum conveyor apparatus 12, is known in the art. Therefore, the first conveyor assembly 14 will not be described in detail herein.

The basic construction of the first conveyor assembly 14 includes a belt conveyor having a conveying surface 22 that conveys multiple lanes of objects or bottles 18 in a downstream direction on the conveying surface. In FIG. 1, the downstream direction is from the bottom of FIG. 1 to the top of FIG. 1. The multiple lanes of bottles 18 are maintained in their side-by-side single file lanes by parallel guide rails 24 positioned over the conveying surface 22 and a portion of the vacuum conveyor apparatus 12. The guide rails 24 extend along the longitudinal length of the conveying surface 22 and along the opposite sides of the lanes of bottles 18, thereby maintaining the lanes of bottles 18 in their single file lanes. In the example of FIG. 1, the guide rails 24 actually extend beyond the downstream end of the first conveyor assembly 14 and over a portion of the longitudinal length of the vacuum conveyor apparatus 12 of the invention.

Gates 26 are provided at the downstream ends of the guide rails 24. The gates 26 are controllable to move between opened and closed positions. In the closed positions, the gates 26 prevent the multiple lanes of bottles 18 from moving beyond the downstream ends of the guide rails 24. Thus, while the first conveying surface 22 and the conveyor of the vacuum conveyor apparatus 12 continue to move in the downstream direction beneath the multiple lanes of bottles 18, the closed gates 26 prevent the multiple lanes of bottles 18 from moving in the downstream direction beyond the gates. When the gates 26 are operated to move to their opened positions, the multiple lanes of bottles 18 are free to move in the downstream direction beyond the downstream ends of the guide rails 24 and beyond the gates 26. Sensors are typically provided in the area of the gates 26 to count a set number of bottles 18 that move in the downstream direction past the gates. Once the set number of bottles has passed the gates, the gates are then operated to move back to their closed positions where the gates again hold back the multiple lanes of bottles 18 as the first conveying surface 22 and the conveyor of the vacuum conveyor apparatus 12 continue to move beneath the bottles.

In the example shown in FIG. 1, the multiple lanes of bottles 18 are six in number. This number of lanes of bottles is illustrative only. The concepts of the invention may be employed with conveyors conveying other numbers of lanes of bottles. Where the bottles 18 have larger diameter or width dimensions than those shown in FIG. 1, the spacing between the guide rails 24 across the lateral width of the first conveying surface 22 would be larger than that shown. Where the diameter or width dimensions of the bottles 18 is smaller than that shown in FIG. 1, the spacing between the guide rail 24 across the lateral width dimension of the first conveying surface 22 would be smaller than that shown. To accommodate different diameter or width dimensions of bottles on the first conveying surface the guide rails are adjustable laterally across the conveying surface. This adjusts the lateral spacing between adjacent guide rails to receive different size bottles between the guide rails.

In the illustrative example of FIG. 1, the multiple lanes of bottles 18 that are released by the gates 26 move into a row former area 28 of the vacuum conveyor apparatus 12. The row former 30 has a construction that, on its own and not used in combination with the vacuum conveyor apparatus 12, is known in the art. Therefore, only the basic construction of the row former 30 will be described herein.

The row former area 28 receives the set number of bottles 18 released by the gates 26 of the vacuum conveyor apparatus 12 and supplied by the first conveyor assembly 14 and arranges the bottles 18 into a two-dimensional array arrangement of the bottles. The basic construction of the row former 30 includes a plurality of straight, parallel bars 32 (See FIG. 3). The bars 32 generally align with the guide rails 24 of the vacuum conveyor apparatus 12 when the row former area 28 receives the set number of bottles from each of the multiple lanes of bottles 18 supplied from the first conveyor 14. The set number of bottles 18 in each of the multiple lanes of bottles released by the gates 26 are received by the vacuum conveyor apparatus 12. A conveying surface conveys the set number of bottles 18 in the multiple lanes of bottles into the vacuum conveyor apparatus 12. In the illustrative example shown in FIG. 1, the conveying surface is a part of the vacuum conveyor apparatus 12 of the invention, which will be described in more detail later.

The end of the row former 30 opposite the first conveyor assembly 14 has stop surfaces between adjacent pairs of the row former bars 32. The stop surfaces stop the movement of the released bottles 18 being conveyed on the belt 126 toward the row former stops 36. With the desired number of bottles 18 release by the gates 26 filling the spacings between the bars 32 of the row former 30, the row former bars 32 then move laterally and sweep the rows of bottles 18 between the pairs of bars 32 from the row former conveying surface and onto a conveying surface 34 of the second conveyor assembly 16. As the bars 32 of the row former 30 with the rows of bottles arrive on the second conveying surface 34, the gates 26 again open to release a sequential group of rows of bottles to the row former area 28. The bars 32 of the row former are then controlled in a conventional manner to move upwardly from the second conveying surface 34 and above the arranged rows of bottles 18 swept onto the second conveying surface. The row former is then controlled to move the row former bars 32 back into substantial alignment with the guide rails 24 of the vacuum conveyor apparatus 12 again and then move downwardly, aligning the spacings between the row former bars 32 with the multiple lanes of bottles 18 released by the gates 26 of the vacuum conveyor apparatus 12.

As the row former bars 32 are moving downwardly and the desired number of bottles in the rows of bottles is reached in the row former area 28, the gates 26 of the vacuum conveyor apparatus 12 are controlled to move to their closed position. The set number of bottles 18 released by the gates 26 fill the spacings between the row former bars 32 as the bars are lowered over the moving bottles. The movement of the row former bars 32 described earlier is then again repeated, moving the set number of bottles 18 between the row former bars 32 onto the second conveyor conveying surface 34. This movement of the row former bars 32 is repeated in forming two-dimensional arrays of bottles 18 on the second conveying surface 34.

Figure 3:
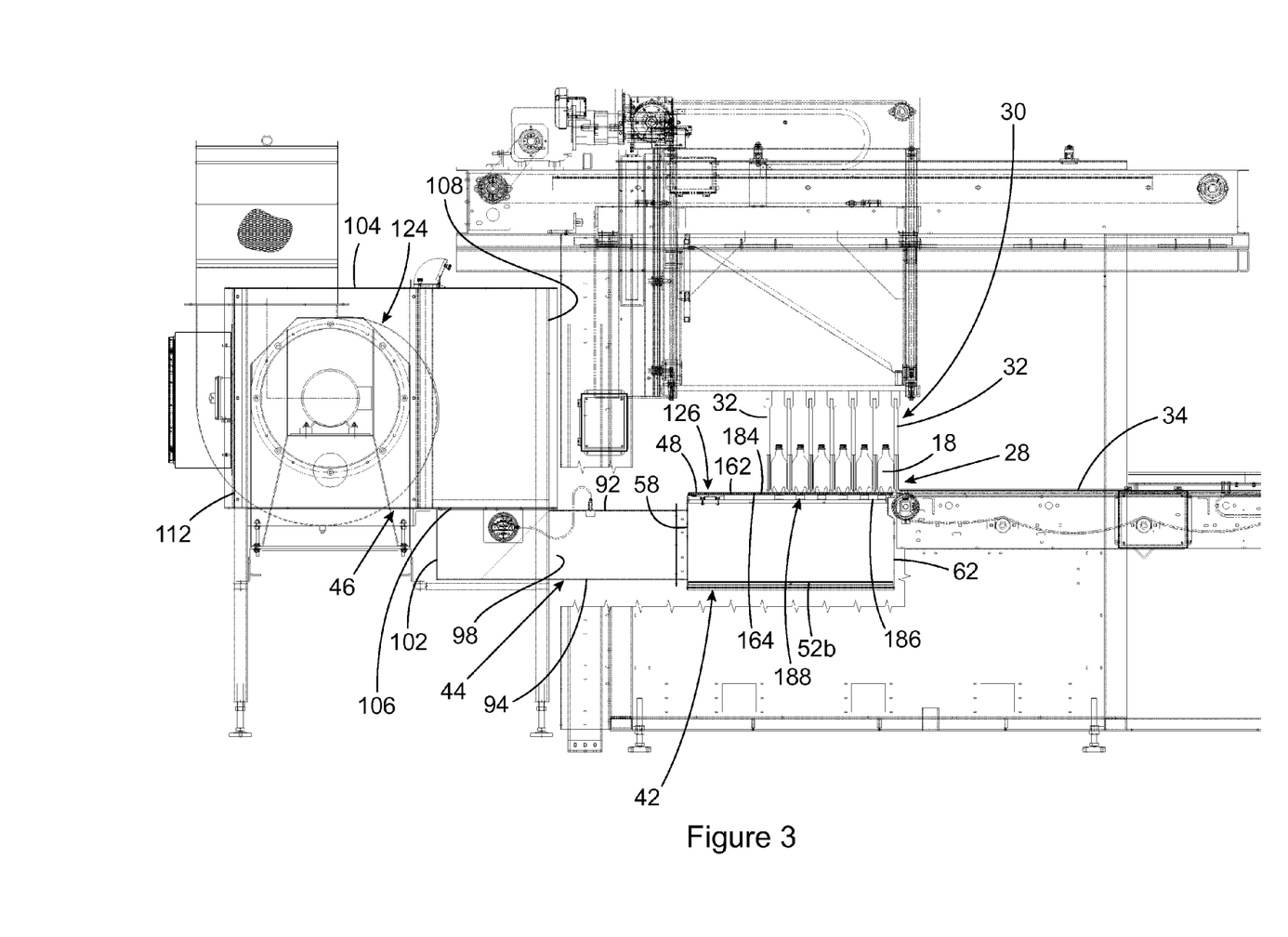
FIG. 3 is a side elevation view of the vacuum conveyor apparatus of the invention in the plane of line 3-3 shown in FIG. 1.

FIG. 1 shows only one example of an environment in which the vacuum conveyor apparatus 12 of the invention could be used. In FIG. 1 the row former area 28 is shown positioned between the first conveyor 14 and the second conveyor 16. In FIG. 3 the row former 30 is shown above the row former area 28 where the vacuum conveyor apparatus 12 functions as the conveyor of the row former area. It should be understood that this is only one example of an environment in which the vacuum conveyor 12 could be used, and the vacuum conveyor 12 is not limited to use in this environment.

The vacuum conveyor apparatus 12 includes a vacuum enclosure or chamber 42, duct work 44 and a vacuum source 46. The vacuum chamber 42 is connected by the duct work 44 to the vacuum source 46. Vacuum suction pressure created by the vacuum source 46 is communicated through the duct work 44 to the interior of the vacuum chamber 42.

Figure 2:
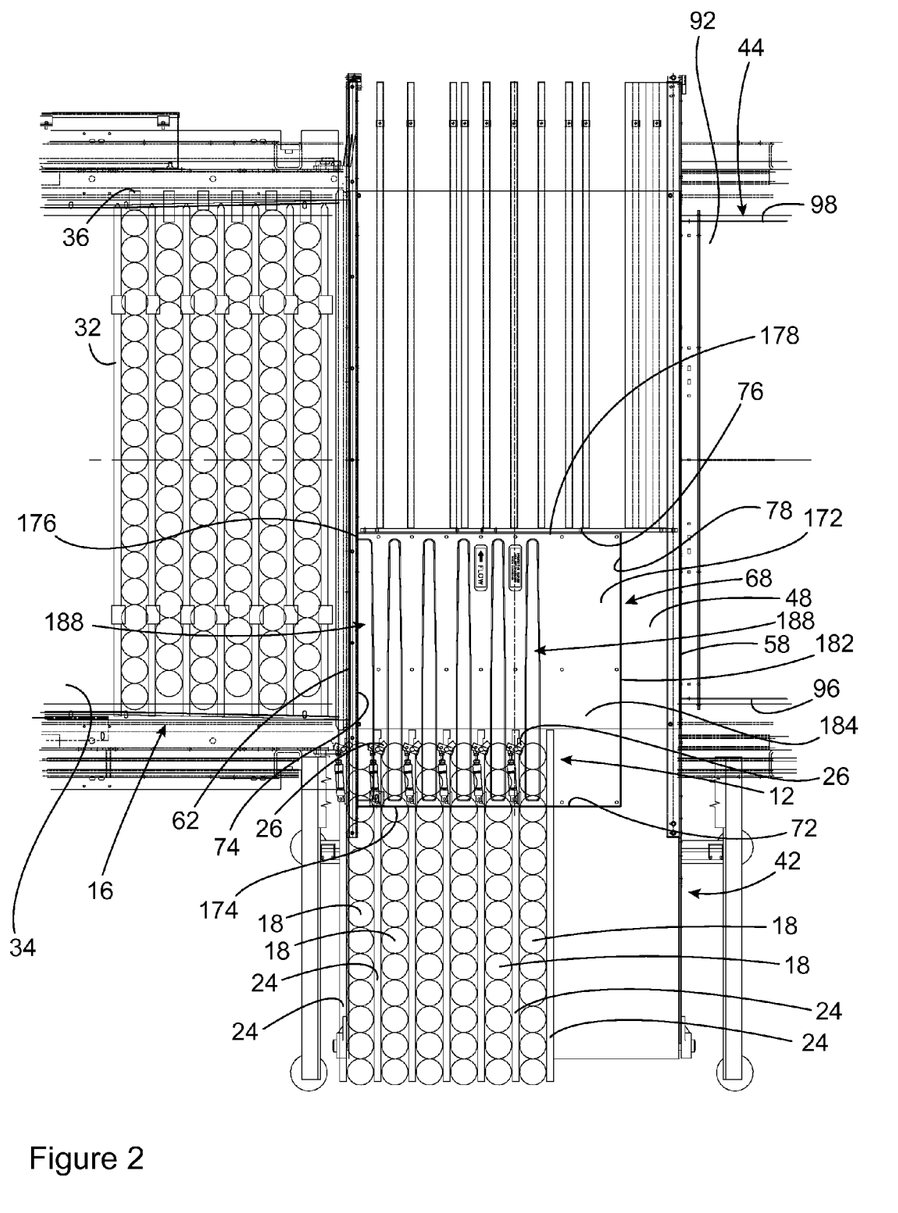
FIG. 2 is an enlarged view of a portion of FIG. 1.
Figure 4:
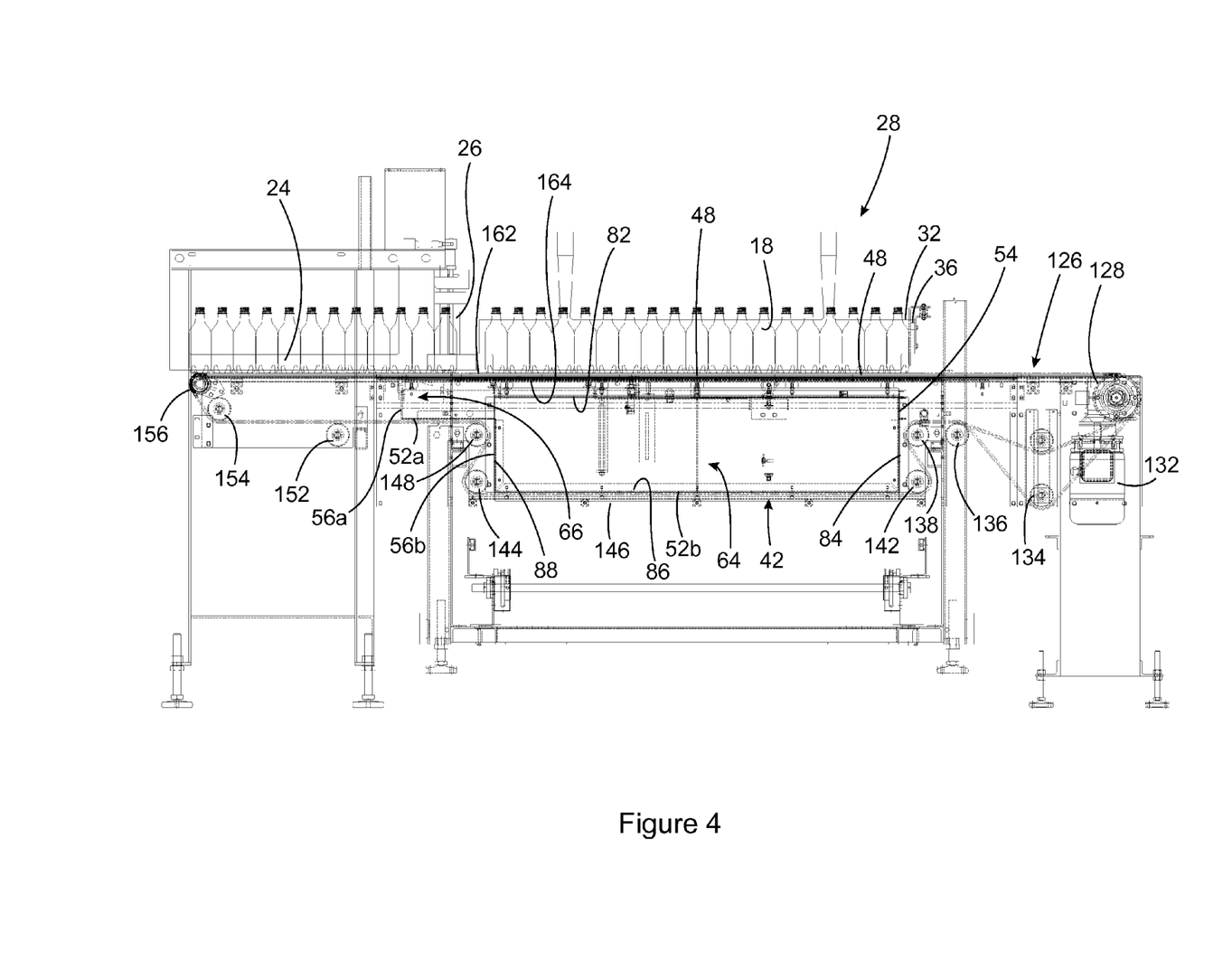
FIG. 4 is a cross-section view of the vacuum conveyor apparatus in a vertical plane along the line 4-4 shown in FIG. 1.
Figure 5:
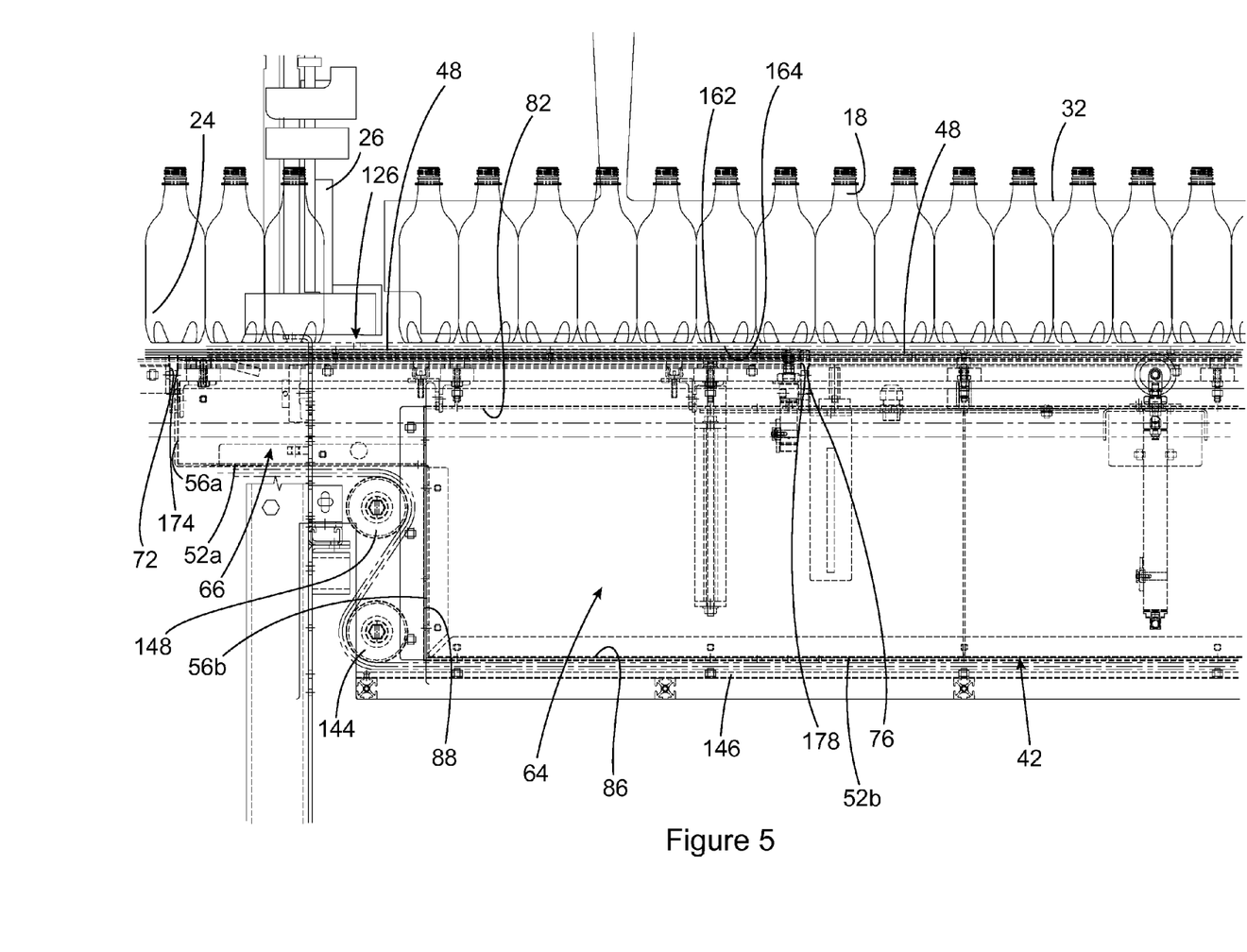
FIG. 5 is an enlarged view of a portion of FIG. 4.

The vacuum chamber 42 is positioned beneath the row former area 28 and adjacent a downstream end of the first conveyor assembly 14 and an upstream end of the second conveyor assembly 16 as shown in FIGS. 1 and 2. The vacuum chamber 44 is constructed as a substantially sealed box having a rectangular top panel 48, front and rear rectangular bottom walls 52a, 52b positioned directly below the top panel 48, a rectangular back wall 54 connected between a back edge of the top panel 48 and a back edge of the rear bottom wall section 52b, upper and lower front wall sections 56a, 56b with the upper front wall section 56a connected between the forward edge of the top panel 48 and a forward edge of the front bottom wall section 52a, and the lower front wall section 56b connected between a rearward edge of the front bottom wall section 52a and the forward edge of the rear bottom wall section 52b, and a pair of side walls 58, 62 connected to opposite side edges of the vacuum source top panel 48, the bottom wall sections 52a, 52b, the back wall 54 and the front wall sections 56a, 56b. As can be seen in FIGS. 4 and 5, the configuration of the vacuum chamber 42 gives it a larger interior volume section 64 positioned beneath the row former area 28 and a smaller interior volume section 66 that projects from the large interior volume section 64 toward the first conveyor assembly 14 and beneath downstream portions of the first conveyor guide rails 24 and the gates 26 on the guide rails. The interior volume sections 64, 66 of the vacuum chamber 42 are substantially sealed except for a panel opening 68 in the vacuum chamber top panel 48 (shown in FIGS. 1 and 2) defined by four panel opening edges 72,74,76,78 (shown in FIG. 2) and a duct opening in the vacuum chamber side wall 58 (shown in FIGS. 3 and 7) defined by four edges 82, 84, 86, 88 (shown in FIG. 6). The large interior volume of the vacuum chamber 42 is needed to ensure that the vacuum pressure communicated to the panel opening 68 is as uniform as possible across the entire area of the panel opening.

Figure 7:
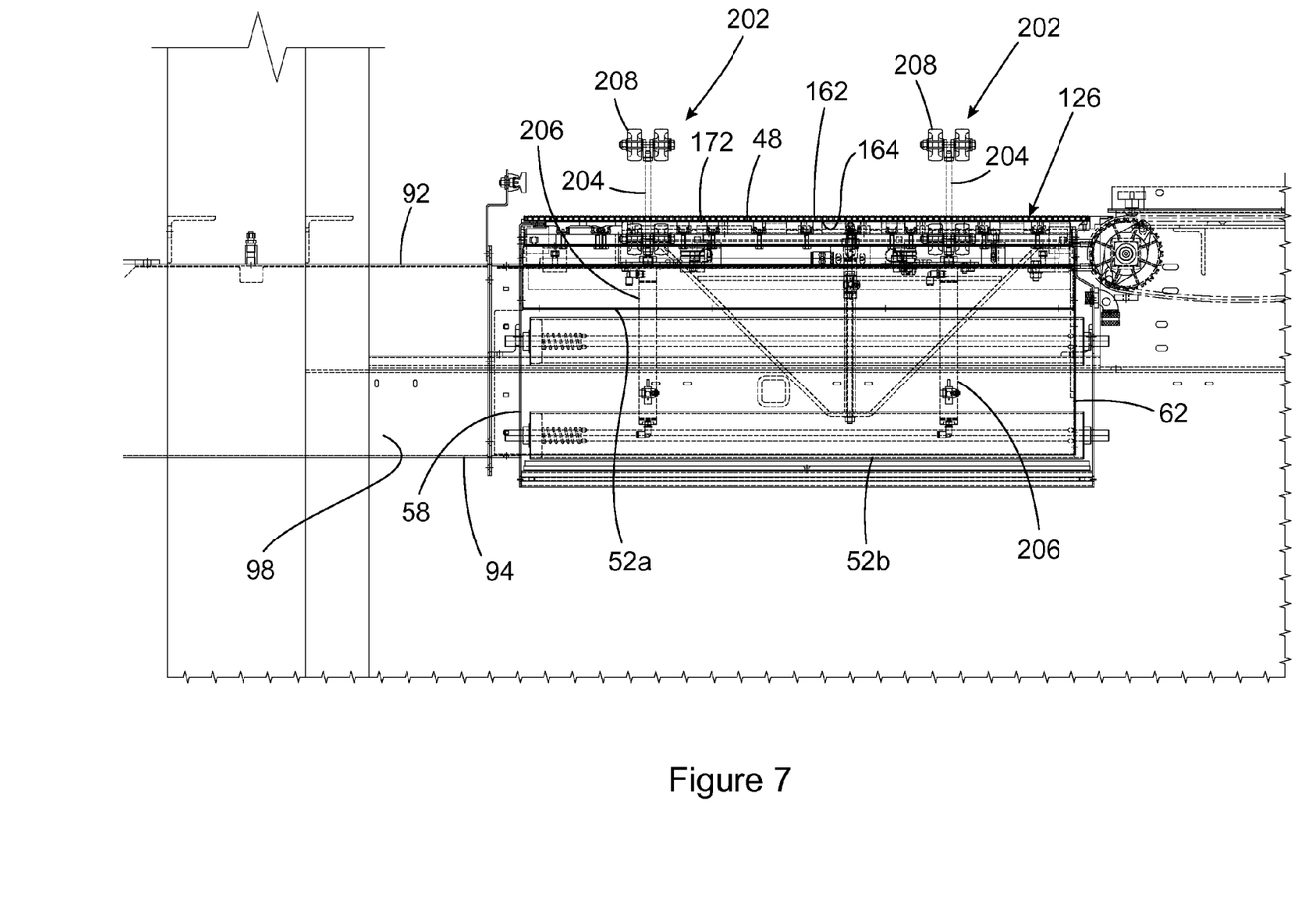
FIG. 7 is a cross-section view of the apparatus in a vertical plane along the line 7-7 shown in FIG. 6.

The duct work 44 has a rectangular cross-section configuration defined by opposite top 92 and bottom 94 walls and opposite side walls 96, 98 (shown in FIGS. 1, 3 and 7). Forward edges of the duct walls 92, 94, 96, 98 are connected to the respective duct opening edges 82, 84, 86, 88 of the vacuum chamber. The connection between the duct work 44 and the vacuum chamber 42 is substantially sealed. The rearward ends of the duct work bottom wall 94 and side walls 96, 98 (shown in FIGS. 1, 3 and 7) are connected to a rear wall 102 of the duct work 44. The duct work top wall 92 does not extend rearwardly to the same extent as the bottom wall 94 or the side walls 96, 98, leaving an opening in the duct work 44 between the rearward edge of the duct work top wall 92 and the duct work rear wall 102.

The vacuum source 46 is basically a large hollow tank or housing that extends over and is connected to the opening at the rearward end of the duct work 44. The housing of the vacuum source 46 is basically comprised of a top wall 104 and an opposite bottom wall 106, a front wall 108 and an opposite rear wall 112 (shown in FIG. 3), and opposite side walls 114, 116 (shown in FIG. 1). The vacuum source housing walls are connected together forming a substantially sealed tank surrounding an interior volume of the vacuum source housing. There is an opening in the bottom wall 106 of the vacuum source housing that coincides with the opening in the top wall 92 of the duct work 44. The vacuum source housing bottom wall 106 and the duct work top wall 92 are connected together around the coinciding openings providing a sealed path of communication between the interior volume of the duct work 44 and the interior volume of the vacuum source housing 46.

A pair of large blowers 122, 124 are attached to the opposite side walls 114, 116 of the vacuum source housing 46. The blowers 122, 124 are in sealed communication with the interior volume of the vacuum source housing 46. Operation of the blowers 122, 124 draws air out of the interior of the vacuum source housing 46 creating a source of vacuum pressure in the housing. The vacuum pressure created in the housing 46 is communicated through the duct work 44 to the vacuum chamber 42. The operation of the blowers 122, 124 is adjustable, enabling the adjustment of the vacuum pressure created in the vacuum source housing 46 and communicated through the duct work 44 with the vacuum chamber 42.

The vacuum conveyor apparatus 12 also includes a belt conveyor where the belt 126 has a length that loops around the vacuum chamber 42 and has a lateral width that extends across the vacuum chamber top panel 48. The belt 126 is a conventional lattice or mesh-type belt and will allow vacuum pressure to be transmitted through the belt. As can be seen in FIGS. 4 and 5, the length of the belt 126 extends across a plurality of sprockets and rollers that enable the belt 126 to wrap, in a continuous loop around the large volume of the vacuum chamber 42.

The belt 126 extends across a plurality of drive sprockets 128 that are driven by a motor 132. Rotation of the drive sprockets 128 pulls the belt 126 across the top panel 48 of the vacuum chamber 42. From the drive sprockets 128 the belt 126 extends downwardly and below a tensioning roller 134 that is biased downwardly. From the tensioning roller 134 the belt 126 extends upwardly over a pair of horizontally spaced rollers 136, 138 and then downwardly and beneath a lower roller 142 that directs the belt 126 beneath the rear section 52b of the vacuum chamber bottom wall. The belt 126 extends beneath the rear bottom wall section 52b and beneath an additional lower roller 144. A panel 146 is spaced a short distance below the rear bottom wall section 52b of the vacuum chamber 42 and the belt 126 slides across the panel 146 as it moves beneath the vacuum chamber. The belt 126 is then directed upwardly and around an upper roller 148 positioned at the corner of the lower front wall section 56b of the vacuum chamber and front bottom wall section 52a of the vacuum chamber. The belt 126 then extends horizontally over a further upper roller 152 and beneath a roller 154 before then extending upwardly and around a plurality of forward idler sprockets 156 that position the belt 126 in substantially the same plane as the conveying surface 22 of the first conveyor assembly 14 and adjacent the downstream end of the first conveyor assembly 14. From there the belt 126 extends horizontally across the top panel 48 of the vacuum chamber 42 and back to the drive sprockets 128, completing the loop of the belt 126.

The portion of the belt 126 that extends across and is supported on the top panel 48 of the vacuum chamber 42 has a top surface 162 and an opposite bottom surface 164. The top surface 162 functions as the conveying surface 162 of the belt 126. The bottom surface 164 slides across the top panel 48 of the vacuum chamber 42 and extends across the panel opening 68 in the vacuum chamber top panel 48. The lateral width of the belt 126 extends across the entire width of the panel opening 68 plus a portion of the top panel 48. As stated earlier, on operation of the drive sprocket motor 132, the vacuum conveyor apparatus belt 126 functions as the conveying surface of the row former area 28.

The vacuum conveyor apparatus 12 also includes a plurality of vacuum directing panels, one vacuum panel 172 of which is shown on the apparatus in FIGS. 1, 2 and 7. The vacuum panel 172 is shown removed from the apparatus 12 in FIG. 8. The vacuum panel 172 has a rectangular configuration defined by four edges 174, 176, 178, 182 of the panel. The vacuum panel 172 also has opposite top 184 and bottom 186 surfaces that are parallel, smooth surfaces. The rectangular configuration of the vacuum panel 172 is dimensioned so that the panel can fit in a snug fit in the panel opening 68 in the vacuum chamber top panel 48. The vacuum panel 172 is positionable in only one position over the panel opening 68. There are supports provided for the vacuum panel 172 along the bottoms of the panel opening edges 72, 74, 76, 78. There are no connections between the vacuum panel 172 and the apparatus 12 so that the vacuum panel 172 can be manually removed from the apparatus 12 and manually placed back on the apparatus. The panel supports position the panel top surface 184 in the same plane as the vacuum chamber top panel 48 when the vacuum panel 172 is positioned in the panel opening 68. The snug fit of the vacuum panel 172 in the panel opening 68 prevents the vacuum panel 172 from appreciably moving in the panel opening, but allows the vacuum panel 172 to be easily manually positioned in the panel opening 68 and manually removed from the panel opening 68. When the vacuum panel 172 is positioned in the panel opening 68, the bottom surface 164 of the vacuum chamber conveyor belt 126 slides across the top surface 184 of the vacuum panel 172. To avoid any damage to the belt 126 by the sliding of the belt bottom surface 164 over the vacuum panel 172, in the preferred embodiment of the vacuum panel 172 all of its edges are radiused or curved.

Figure 8:
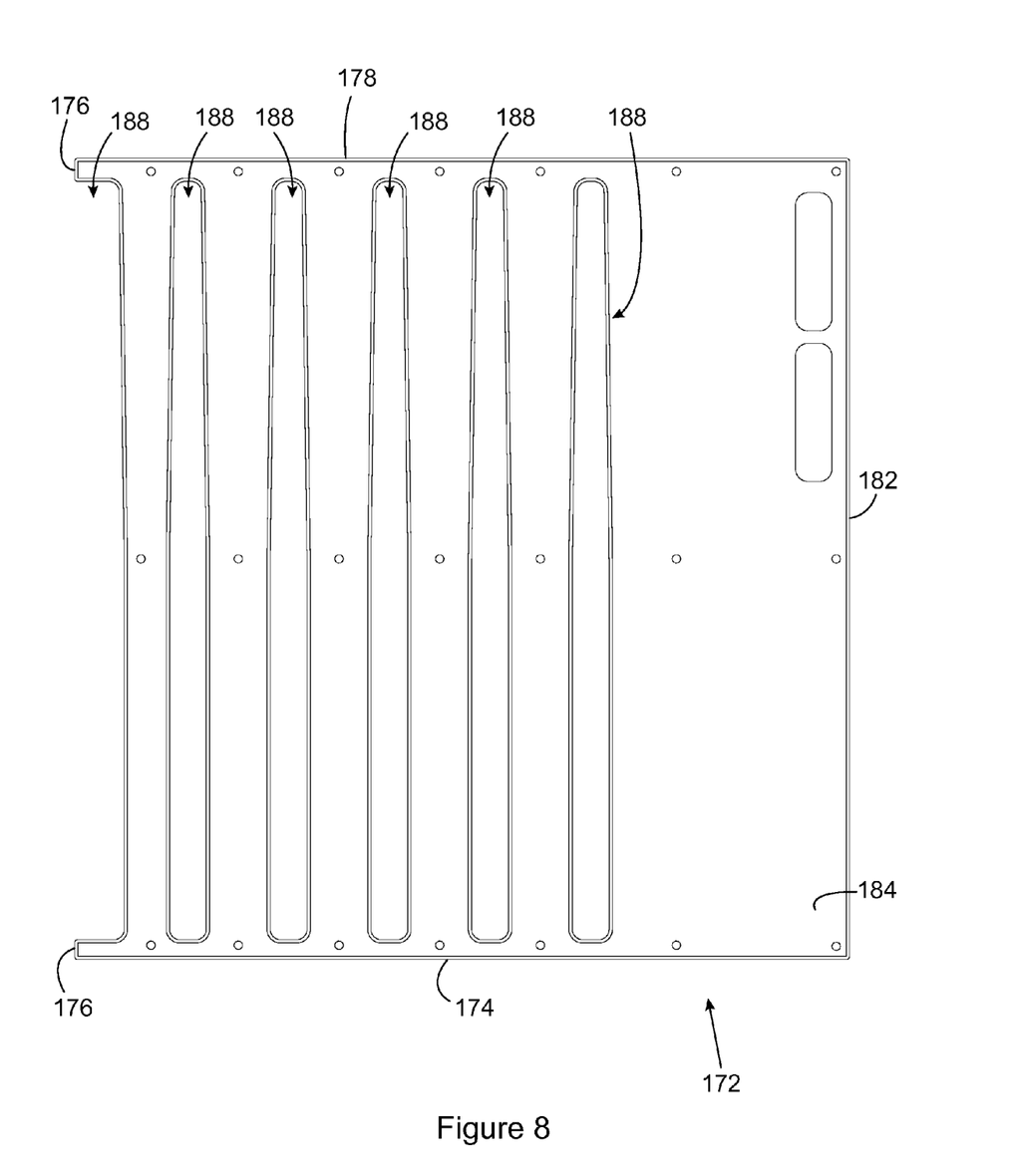
FIG. 8 is a plan view of one embodiment of the vacuum directing panel of the apparatus.

The vacuum panel 172 has a plurality of longitudinally extending slots 188 that pass completely through the panel from the top surface 184 to the bottom surface 186. The longitudinal length of the slots 188 is about ⅓ of the overall length of the row former area 28. The slots 188 are slightly wider in the area of the first conveyor gates 26 where a sufficient amount of suction pressure is needed most. The slots 188 are equal in number to the number of multiple lanes of bottles 18 being conveyed by the first conveyor assembly 14. In the embodiment of the vacuum panel 172 shown in the drawing figures, there are six panel slots 188 corresponding to the six lanes of objects 18 conveyed on the conveyor belt 126 of the vacuum conveyor apparatus 12 or any number of lanes, one to six as needed, released by the gates. One of the slots, the left most slot 188 as seen in FIGS. 2 and 8, is formed into an edge 176 of the vacuum panel 172. The configuration of this slot 188 is completed by an edge 74 of the panel opening 68. This positioning enables all of the slots 188 to be positioned close to the second conveyor 16 and thereby reduce the time it takes for the row former 30 to sweep arranged rows of bottles 18 onto the second conveyor 16 and save on the return time of the row former 30 back to the row former area 28 sweep zone. The plurality of panel slots 188 are spaced laterally side by side across the vacuum panel 172. The lateral width dimension of each slot and the lateral spacing distance between adjacent panel slots 188 is determined by the diameter or width dimensions of the bottles in the multiple lanes of bottles 18 to be conveyed on the first conveyor assembly 14 and on the vacuum conveyor apparatus 12. Multiple lanes of larger bottles 18 require a larger lateral spacing distance between adjacent slots 188 than do multiple lanes of smaller bottles. Conversely, multiple lanes of smaller bottles 18 require a smaller lateral spacing distance between adjacent slots 188 than do multiple lanes of larger bottles. Additionally, the size of the bottle bottom surface and the shape of the bottle bottom surface effect the stability of the bottle and will influence the lateral size of the slot needed to keep the bottle stable on the conveying surface. The lateral width dimension of each of the panel slots 188 and the lateral spacing distance between adjacent slots 188 positions one slot under each of the lanes of objects or bottles 18 of the multiple side-by-side lanes of bottles 18 conveyed on the conveying surface 162 of the vacuum conveyor apparatus 12. The panel slots 188 separate the vacuum suction pressure created by the vacuum source 46 and delivered by the duct work 44 to the interior of the vacuum chamber 42. The slots 188 direct the vacuum suction pressure through the slots 188 and through the openings of the lattice or mesh belt 126 directly above the slots to the center areas of the bottom surfaces of the bottles 18 in each of the multiple side-by-side lanes of bottles conveyed on the apparatus conveying surface 162. In this manner, the vacuum suction pressure is separated and directed along the multiple longitudinally extending paths defined by the longitudinal configurations of the panel slots 188, through the lattice or mesh belt 126 moving over the panel top surface 184 and to the bottom surfaces of the bottles 18 in the multiple side-by-side lanes of bottles being conveyed by the conveyor top surface 162 over the vacuum panel 172. The vacuum suction pressure delivered by the panel slots 188 to the bottom surfaces holds the bottles down on the conveying surface 162 for a short distance behind the gates and prevents the lead bottles from falling over when the gates are opened and the conveying surface 162 is accelerated. The vacuum suction pressure along the longitudinal lengths of the slots 188 then sequentially stabilizes all the bottles 18 in the multiple side-by-side lanes conveyed on the conveying surface 162 along the slots and holds the bottles in their upright orientations and in their multiple side-by-side lanes. The stabilized lanes of bottles are conveyed from the vacuum panel top surface 184 and across the vacuum chamber top panel 48. The apparatus belt conveyor 126 then decelerates and as the set number of bottles in the lane of bottles delivered to the row former area 28 are stopped by the engagement of each lead bottle in the lanes of bottles with the stop surfaces of the row former 30 the vacuum pressure delivered to the slot 188 stabilizes the bottles at the ends of the lanes and prevents them from falling over.

Figure 9:
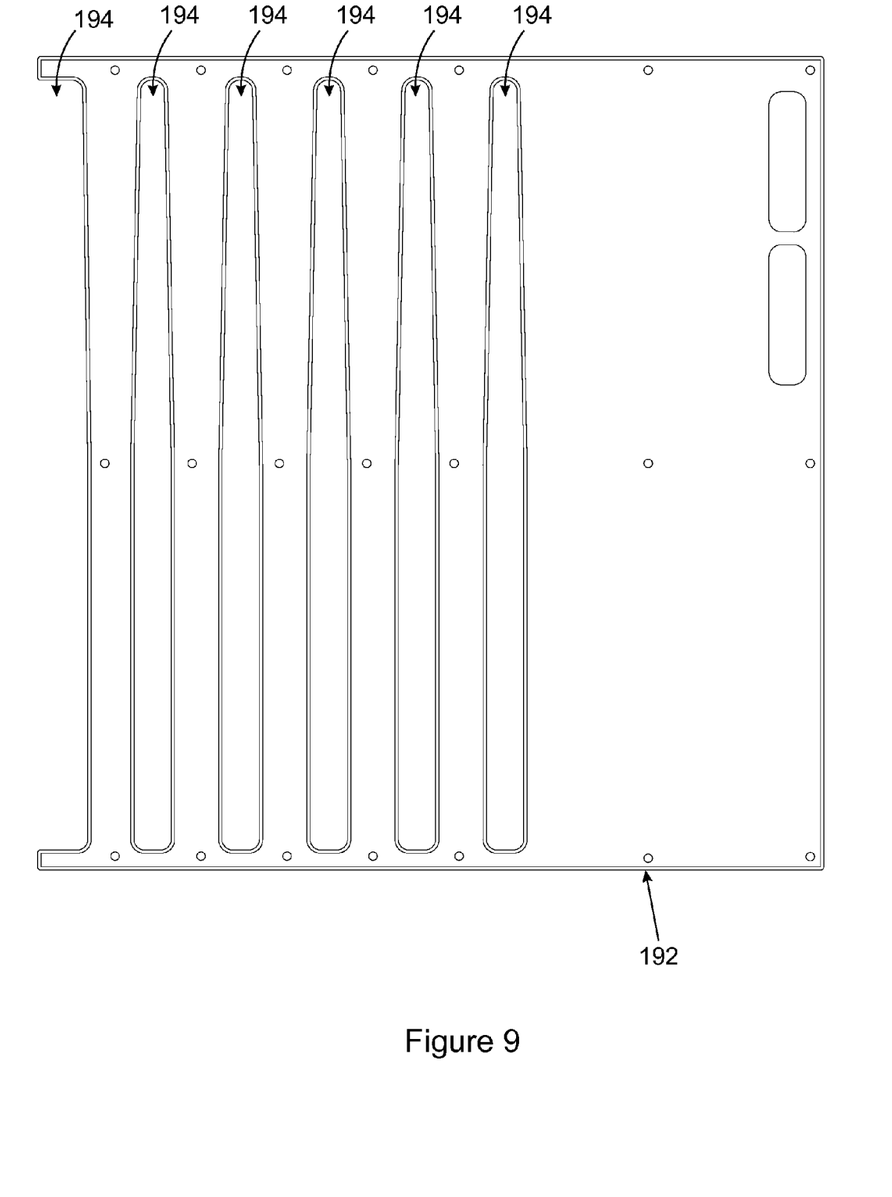
FIG. 9 is a plan view of a second embodiment of the vacuum directing panel of the apparatus.

Furthermore, the vacuum conveyor apparatus 12 of the invention includes at least one additional or second panel 192 that has the same rectangular configuration and thickness between its opposite top and bottom surfaces as the first described vacuum panel 172. An example of an additional panel 192 is shown in FIG. 9. The only difference between the second vacuum directing panel 192 and the first vacuum directing vacuum panel 172 is in the lateral width dimensions of the slots 194 and the lateral spacing distance of the slots 194 on the second panel 192. Where the previously described vacuum panel 172 was constructed for six lanes of objects or bottles 18 having a first diameter or width dimension being conveyed on the apparatus belt conveyor 126, the second vacuum directing panel 192 is constructed for six side-by-side lanes of objects having a second diameter or width dimension being conveyed on the apparatus belt conveyor 126. The lateral spacing distance of the second panel slots 194 is smaller than that of the first panel slots 188. The second panel is designed for use when the vacuum conveyor apparatus is conveying objects with smaller diameter or width dimensions than the objects 18 previously described. Providing a second vacuum directing panel 192 with a different spacing of the six panel slots 194, or providing a third, fifth or more such panels with different spacing distances between the slots enables the vacuum conveyor apparatus 12 to be quickly, manually changed over to accommodate the lanes of objects with different width or diameter dimensions being conveyed on the vacuum conveyor apparatus 12. For example, to change over the vacuum conveyor apparatus 12 for use in conveying six lanes of bottles 18 with larger diameter or width dimensions to then conveying six lanes of bottles having smaller diameter or width dimensions, the vacuum-directing panel 172 with six slots 188 is manually removed from the panel opening 68 and replaced with another panel having six slots having a smaller or larger lateral spacing distance between the slots. The slots are laterally positioned in the second 192 panel to correspond to the centers of the side-by-side lanes of smaller bottles being conveyed by the first conveyor assembly 14 to the vacuum conveyor apparatus 12. Positioning the second 192 panel in the panel opening 68 separates and directs the vacuum suction pressure in the vacuum chamber 42 along longitudinally extending and laterally spaced pathways corresponding to the positions of the slots 194 and corresponding to the longitudinal spacing of the side-by-side lanes of smaller bottles conveyed on the first conveyor assembly 14 to the vacuum conveyor apparatus 12.

The second vacuum-directing panel 192 or any other additional vacuum directing panels function in the same manner as the first described vacuum-directing vacuum panel 172. Each of the additional panels provide vacuum pressure along the longitudinally extending and laterally spaced paths defined by the slots through the panel that correspond to the center areas of the bottles in each of the side-by-side lanes of bottles conveyed on the apparatus conveying surface 162. The second or other additional vacuum-directing panel thereby stabilizes the bottles in their side-by-side lanes and maintains the bottles in their upright orientations and in their side-by-side lane positions as the bottles are conveyed by the first conveyor assembly 14 and the vacuum conveyor apparatus 12 of the invention.

Figure 6:
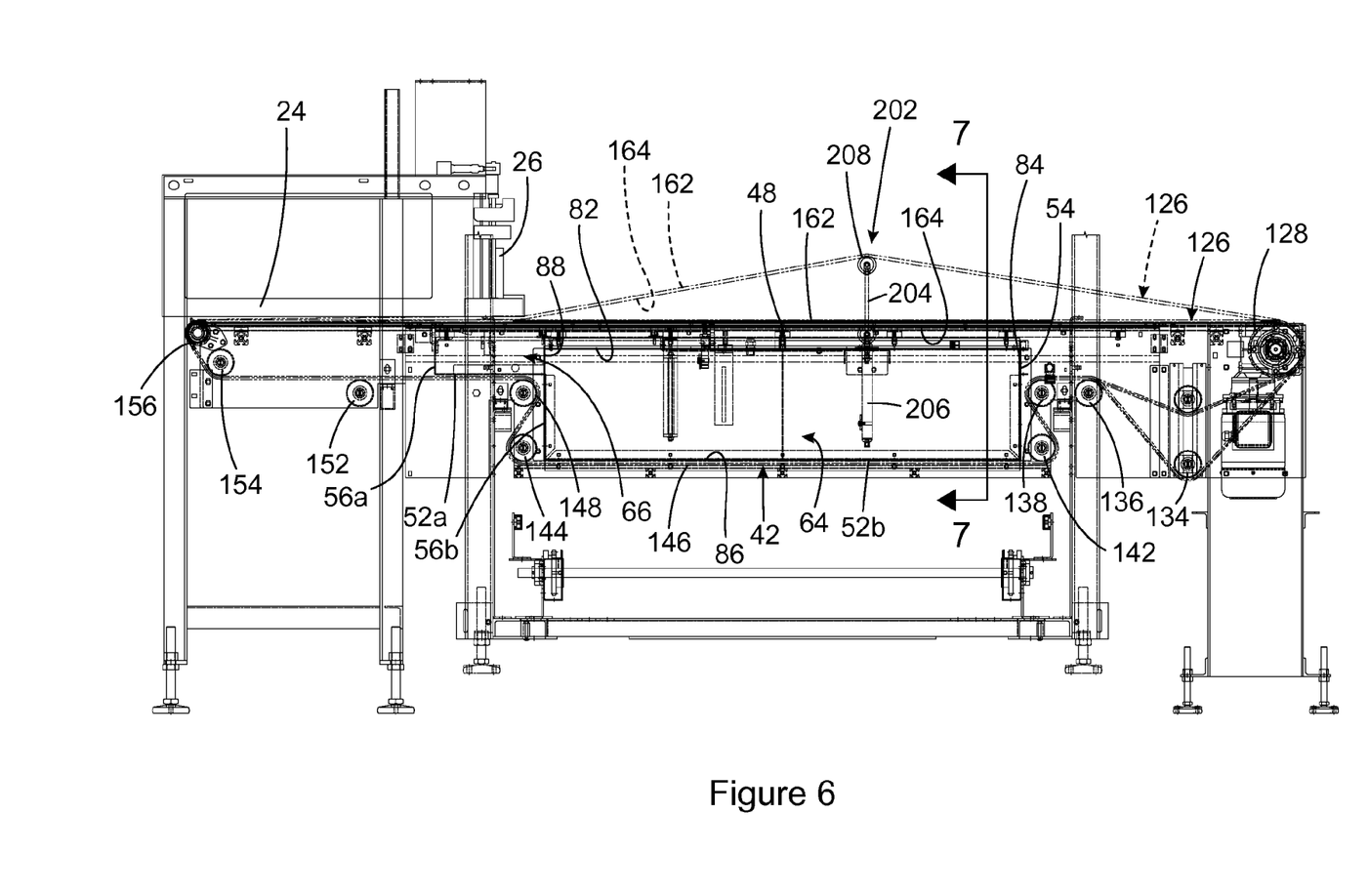
FIG. 6 is a view similar to FIG. 4, but showing a conveyor belt lifting feature of the apparatus.

FIGS. 6 and 7 show a further feature of the vacuum conveyor apparatus 12 that assists in manually removing a vacuum panel 172 from the panel opening 68 in the vacuum chamber top panel 48 and replacing that vacuum panel 172 with a second or other additional panel. FIGS. 6 and 7 show a lifting apparatus 202 that is operated to lift the portion of the apparatus belt conveyor 126 that extends over the vacuum chamber top panel 48 and the panel opening 68 to enable the vacuum panel 172 in the panel opening 68 to be easily removed and replaced with another vacuum-directing panel. The lifting apparatus 202 is comprised of a pair of laterally spaced rod 204 and cylinder 206 assemblies. Pairs of rollers 208 are mounted on the distal ends of the rods 204. The rollers 208 engage in rolling contact with the bottom surface 164 of the apparatus belt conveyor 126. The rod 204 and cylinder 206 assemblies are pneumatically actuated assemblies that are controlled to selectively move between retracted positions where the rods 204 are rollers 208 are positioned beneath the apparatus belt conveyor 126 as shown in FIG. 4, and extended positions of the rods 204 from the cylinders 206 where the rollers 208 raise the apparatus belt conveyor 126 above the vacuum chamber top panel 48 and above the panel opening 68 as shown in FIG. 6. The raised conveyor belt 126 shown in FIG. 6 provides ample room below the raised belt 126 to allow the vacuum-directing panel currently residing in the panel opening 68 to be easily manually removed from the panel opening and then replaced with another vacuum-directing panel. The lifting apparatus 202 is also provided with sensors that distinguish between the rods 204 being extended from the cylinders 206 and the rods 204 being retracted into the cylinders 206. The sensors communicate with the control system of the vacuum conveyor apparatus 12 which prevents the motor 132 that drives the drive sprockets 128 of the apparatus from operating when the rods 204 are extended from the cylinders 206. This ensures that the motor 132 can only drive the apparatus belt conveyor 126 when the rods 204 are in their retracted positions in the cylinders 206. The sensors also prevent the blowers 122 from running when the rods 204 are extended.

Additionally, sensors are provided in the panel openings 68 in the vacuum chamber top panel 48 that sense when a vacuum-directing vacuum panel 172, 192 or any other similar panel is in its proper position in the panel opening 68. These sensors prevent the operation of the apparatus motor 132 when a vacuum-directing vacuum panel 172, 192 is not properly positioned in the panel opening 68.

In view of the foregoing, it will be seen that the several advantages of the invention are achieved and attained.

As various modifications could be made in the constructions herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An apparatus that provides vacuum suction pressure to a conveying surface to stabilize objects conveyed on the conveying surface, the apparatus comprising:
    a conveyor having a top conveying surface and an opposite bottom surface, the top conveying surface having a longitudinal length that extends from an upstream end of the conveying surface to an opposite downstream end of the conveying surface, the conveying surface having a lateral width dimensioned for supporting multiple longitudinally extending lines of objects arranged laterally side-by-side on the conveying surface and conveying the multiple lines of objects in a downstream direction from the upstream end of the conveying surface to the downstream end of the conveying surface, the conveyor having a plurality of longitudinally spaced and laterally spaced holes through the conveyor from the top conveying surface to the bottom surface;
    a source of vacuum pressure;
    a chamber communicating with the source of vacuum pressure and extending beneath the conveyor bottom surface, the chamber having an opening positioned beneath the conveyor bottom surface, the opening communicating vacuum pressure communicated through the chamber from the source of vacuum pressure with the conveyor bottom surface whereby the vacuum pressure is communicated through the plurality of holes through the conveyor to the conveyor top conveying surface; and,
    a panel positioned over the chamber opening and between the chamber opening and the conveyor bottom surface, the panel having at lease one longitudinally extending slot through the panel where the slot directs vacuum pressure communicated through the chamber opening to holes of the plurality of holes through the conveyor that are positioned above the panel slots whereby the vacuum pressure is communicated to the holes on the top conveying surface of the conveyor that are positioned above the panel slots.

2. The apparatus of claim 1, further comprising:
    the slot is one of a multiple of longitudinally extending and laterally spaced slots through the panel.

3. The apparatus of claim 2, further comprising:
    the panel being one panel of a plurality of separate panels that are each separately positionable over the chamber opening with each panel of the plurality of separate panels having a different lateral spacing between the multiple of slots through the panel than other panels of the plurality of separate panels.

4. The apparatus of claim 2, further comprising:
    the panel being one panel of a plurality of separate panels that are each separately removably positionable over the chamber opening with each panel of the plurality of separate panels having a different lateral width dimension of the slots through the panel than the other panels of the plurality of separate panels.

5. The apparatus of claim 2, further comprising:
    each panel of the plurality of panels being manually positionable over the chamber opening and manually removable from the chamber opening.

6. The apparatus of claim 2, further comprising:
    the conveyor bottom surface engaging in sliding engagement over the panel.

7. The apparatus of claim 2, further comprising:
    the panel is supported on the chamber over the chamber opening and there are no connections between the panel and the chamber.

8. The apparatus of claim 2, further comprising:
    a lifting mechanism on the apparatus that is selectively operable to lift the conveyor and provide clearance between the conveyor bottom surface and the chamber opening for removing the panel from the chamber opening and positioning the panel over the chamber opening, and to lower the conveyor over the panel and the chamber opening.

9. The apparatus of claim 2, further comprising:
    the source of vacuum pressure being adjustable to thereby adjust the vacuum pressure communicated to the holes on the top conveying surface of the conveyor that are positioned over the panel slots.

10. The apparatus of claim 2, further comprising:
    the panel being positionable in only one position over the chamber opening.

11. The apparatus of claim 2, further comprising:
    the multiple of slots through the panel is equal in number to the multiple lines of objects supported on the conveying surface.

12. The apparatus of claim 2, further comprising:
    a conveyor assembly conveying multiple lines of objects in single file lines to the upstream end of the conveying surface.

13. The apparatus of claim 2, further comprising:
    a row former positioned above the conveying surface.

14. An apparatus that provides vacuum pressure to a conveying surface to hold objects in position on the conveying surface, the apparatus comprising:
    a source of vacuum pressure;
    an enclosure having a hollow interior in communication with the source of vacuum pressure whereby the source of vacuum pressure creates a vacuum pressure inside the enclosure interior, the enclosure having an exterior opening that communicates with the enclosure interior and the vacuum pressure inside the enclosure interior;
    a conveyor having a conveying surface having a longitudinal length extending over the enclosure opening and a lateral width extending over the enclosure opening, the conveying surface width being dimensioned for supporting multiple longitudinally extending lines of objects spaced laterally across the conveying surface, the conveying surface having a plurality of openings therethrough; and a panel positioned over the enclosure opening and between the enclosure opening and the conveying surface, the panel having at lease least one opening through the panel that communicates through the enclosure opening with the vacuum pressure created inside the enclosure interior whereby the vacuum pressure is communicated through the opening in the panel and through the plurality of openings through the conveying surface to the multiple lines of objects supported on the conveying surface and thereby holds the multiple lines of objects to the conveying surface.

15. The apparatus of claim 14, further comprising:
the opening being one of a multiple of openings through the panel that communicate through the enclosure opening with the vacuum pressure created inside the enclosure interior.

16. The apparatus of claim 15, further comprising:
the panel being one panel of a plurality of separate panels that are each separately removably positionable over the enclosure opening and with each panel having a different lateral spacing between the openings through the panel.

17. The apparatus of claim 15, further comprising:
the panel being one panel of a plurality of separate panels that are each separately removably positionable over the enclosure opening with each panel of the plurality of separate panels having a lateral width dimension of the different openings through the panel than the other panels of the plurality of separate panels.

18. The apparatus of claim 15, further comprising:
the multiple openings through the panel are parallel longitudinally extending slots through the panel.

19. The apparatus of claim 15, further comprising:
each panel of the plurality of panels being manually removable from over the enclosure opening and manually positionable over the enclosure opening.

20. The apparatus of claim 15, further comprising:
each panel of the plurality of panels being separately supported by the enclosure over the enclosure opening with there being no connections between the supported panel and the enclosure.

21. The apparatus of claim 15, further comprising:
the conveyor engaging in sliding engagement with the panel.

22. The apparatus of claim 15, further comprising:
the conveyor being movable between a lowered position where the conveyor is directly above the panel over the enclosure opening and a raised position where the conveyor is spaced above the panel creating a clearance space between the panel and the conveyor enabling the panel to be removed from over the enclosure opening.

23. The apparatus of claim 15, further comprising:
the source of vacuum pressure being adjustable to thereby adjust the vacuum pressure communicated through the plurality of openings through the conveying surface.

24. The apparatus of claim 15, further comprising:
the panel being positionable in only one position over the enclosure opening.

25. The apparatus of claim 15, further comprising:
a conveyor assembly conveying multiple lines of objects in single file lines to the upstream end of the conveying surface.

26. The apparatus of claim 15, further comprising:
a row former positioned above the conveying surface.

* * * * *